M. M. DEEM.
CYCLE SADDLE.
APPLICATION FILED DEC. 4, 1913.

1,157,512.

Patented Oct. 19, 1915.

Witnesses.

Inventor:-
Miller M. Deem.
by his Attorneys.

UNITED STATES PATENT OFFICE.

MILLER M. DEEM, OF READING, PENNSYLVANIA, ASSIGNOR TO THE READING SADDLE & MANUFACTURING COMPANY, OF READING, PENNSYLVANIA, A CORPORATION OF PENNSYLVANIA.

CYCLE-SADDLE.

1,157,512.  Specification of Letters Patent.  Patented Oct. 19, 1915.

Application filed December 4, 1913. Serial No. 804,708.

*To all whom it may concern:*

Be it known that I, MILLER M. DEEM, a citizen of the United States, residing in Reading, Pennsylvania, have invented certain Improvements in Cycle-Saddles, of which the following is a specification.

My invention relates to saddles for motor-cycles, bicycles and the like, and its object is the provision of a novel and improved rear spring construction.

In spring saddles for motor-cycles, and the like, coiled wire springs, either of the compression or tension type, or both combined, have come into use as rear spring supports for the saddle seat, and have been found to furnish the desired strength and resiliency for the purpose. It has been found desirable, however, to avoid in such constructions single springs of undue length, by reason of their lack of stability and tendency to buckle; and to avoid this the device of using a plurality of shorter springs on either side of the saddle has been adopted. In such cases, however, the problem has been to secure compactness, sufficient rigidity to prevent undue side swing of the seat, durability, and the avoidance of rattling of parts and chafing of the springs against each other. As a solution of this problem I have devised the construction hereinafter described.

Figure 1:
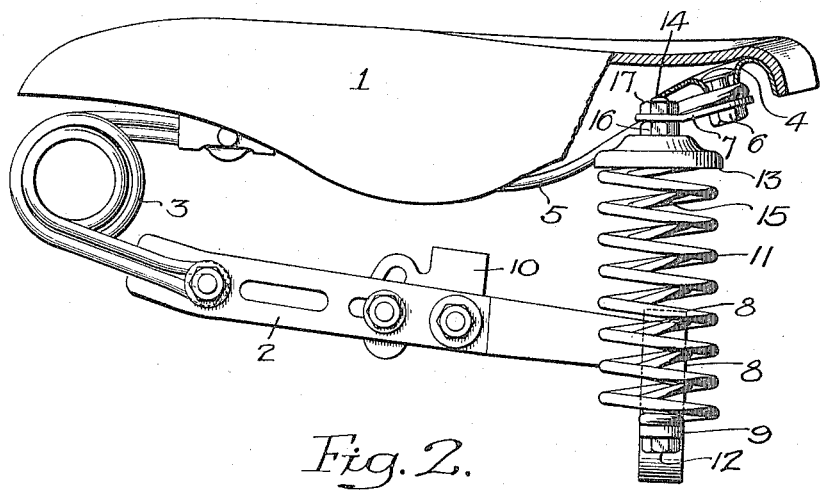
Figure 2:
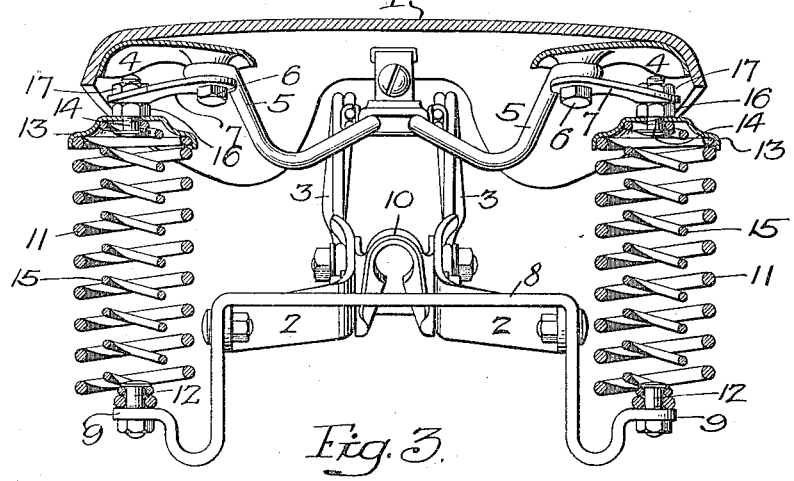
Figure 3:
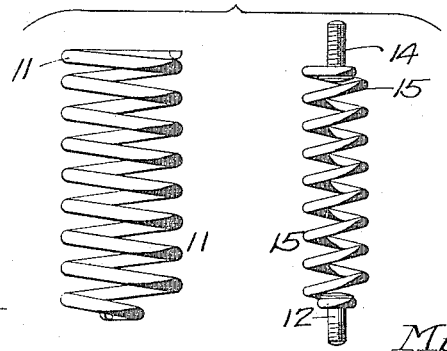

In the accompanying drawings:—Figure 1 is a side elevation, partly in section, of a saddle embodying my invention; Fig. 2, is a transverse section through the rear springs; Fig. 3 is a detached view of two compression springs employed in my construction.

In the drawings, the saddle seat 1 is secured at the peak to the main support 2 by means of the front springs 3, in the usual manner, and at the rear is provided with the usual cantle 4. The seat is also provided with the stretcher rods 5 extending from the peak to the cantle and secured to the latter by bolts 6. Said bolts 6 also serve to secure to the cantle on either side of the saddle the plates or hangers 7 from which depend the rear springs as hereinafter described.

The main frame or support comprises side members 2 spaced apart, and secured at the rear to the transverse brace 8. Said member 8 has its ends extended downwardly and outwardly as shown to serve as brackets or supports 9 for the rear springs. The clamp 10, secured between the side members 2 of the main-frame, is provided for clamping the saddle to the saddle-post.

On each side of the saddle, interposed between the cantle and the main support, I have provided a pair of helical compression springs, one spring of the pair being within the other. The spring construction on both sides of the saddle being the same, description of one pair will suffice for both.

The outer spring 11 (shown detached in Fig. 3) is secured at its lower end to the support 9 on the main-frame, by bolt 12, and at its upper end fits snugly within the flanged cap-plate 13 secured to the hanger 7 by bolt 14. The inner spring 15 is also secured at its lower end to the support 9 on the main-frame, by bolt 12, but at its upper end is secured directly to the bolt 14. As will be seen from Fig. 3, the inner spring 15 is before assembly somewhat shorter than the outer spring 11. As the parts are assembled the spring 15 is distended, the uppermost coil thereof being drawn tightly against the cap-plate 13 by means of the nut 16 on the bolt 14. The cap-plate and spring are then rigidly secured to the hanger 7 by means of said bolt 14 and the nut 17.

As will readily be seen, the inner spring 15, being under a certain amount of tension, will serve to keep the cap-plate 13 firmly seated upon the uppermost coil of the main compression spring, and prevent rattling of the parts at that point. Further the inner compression spring, being firmly secured both to the seat and the main-frame will act as a positive connection between those parts and prevent disarrangement of the spring construction when the wheel is lifted by grasping the saddle, or the seat subjected to sharp upward strains in riding.

In action, the inner spring 15 does not serve as a supporting spring until after the seat has been depressed sufficiently to cause said spring to resume its normal length. Upon further depression of the seat the spring 15 then acts with the spring 11 as an auxiliary supporting spring. It will be seen, therefore, that under light normal strains the saddle is resiliently supported at the rear by the compression springs 11 acting alone, the resistance of these springs being even counteracted, to some slight extent, by the tension of the springs 15, while under heavier and abnormal strains the seat is supported by the entire combined strength of both sets of compression springs acting together. The construction thus furnishes a graduated support for the saddle, which has all the required resiliency, coupled with the necessary strength and stiffness to withstand the severe strains. The inner springs 15 also serve as tension springs, furnishing a resilient check upon the rebound of the saddle.

The relative stiffness of the springs 11 and 15 may be varied as desired by the constructor, and for some uses it may be deemed unnecessary to employ springs of unequal length. Such change I would not wish regarded as a departure from my invention in its broader aspect.

By employing a cap-plate 13 of the specific form shown, I furnish independent seats in said plate at different heights for the receipt of the uppermost coils of the inner and outer springs. This is desirable, as the construction prevents any tendency of parts to rattle at such point, but in the broader aspect of my invention, I do not wish to be limited to any particular form of cap plate, and in fact the cap-plate might itself be dispensed with, other means for securing the springs being employed.

I claim:

1. In a cycle saddle, in combination with the saddle seat and main frame, a pair of compression springs interposed between said frame and seat and serving to support the latter, said seat resting upon the upper coils of the springs, a second pair of coiled springs interposed between and connected to said frame and seat, said second pair of springs being normally under tension but being adapted, upon depression of the seat, to serve as compression springs to aid in supporting said seat.

2. In a cycle saddle, the combination of the saddle seat, the main support, a main compression spring interposed between said seat and support and secured at its lower end to said support, a cap-plate seated upon the uppermost coil of said main spring, and secured to the saddle seat, a second spring, within the main spring normally under tension and having its lower end secured to the frame, and its upper end secured to said cap-plate.

3. A rear-spring construction for cycle-saddles, comprising a lower bar for securing the springs to the saddle-frame, two pairs of compression springs secured at their lower ends to said bar, each pair comprising inner and outer springs, plates resting upon the upper ends of the outer springs and secured to the upper ends of the inner springs, said plates providing upper and lower seats of different diameters to receive the upper coils of said inner and outer springs, and means for securing said plates to the seat structure.

In testimony whereof, I have signed my name to this specification, in the presence of two subscribing witnesses.

MILLER M. DEEM.

Witnesses:
CHARLES H. HOWSON,
JAS. H. KLEIN.

Copies of this patent may be obtained for five cents each, by addressing the "Commissioner of Patents, Washington, D. C."